March 13, 1928.

W. J. GAGNON 1,662,665

COUPLING FOR BEAD CHAINS

Filed June 25, 1927

Inventor:
WILLIAM J. GAGNON
By his Attorneys

Patented Mar. 13, 1928.

1,662,665

UNITED STATES PATENT OFFICE.

WILLIAM J. GAGNON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

COUPLING FOR BEAD CHAINS.

Application filed June 25, 1927. Serial No. 201,541.

My invention relates to couplings, and the object of my invention is to provide a simple and inexpensive coupling for use with a bead chain.

In the accompanying drawings

Figure 1:
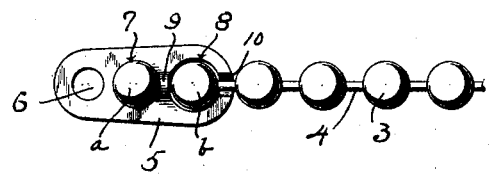
Figure 2:
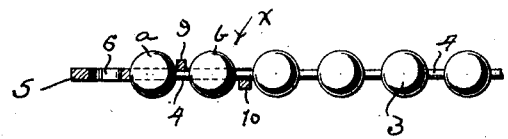

Fig. 1 is a plan view of a coupling in which my invention is embodied in one form; and Fig. 2 is a side elevation at right angles to Fig. 1 showing the coupling member in section.

My invention is intended particularly for use in connection with bead chains of the type comprising balls 3 flexibly interconnected by dumbbell links 4.

The coupling comprises a plate 5 struck from sheet metal, apertured at 6 to accommodate a jump ring or the like, and at 7 and 8 respectively to accommodate the two end balls $a$ and $b$ of a bead chain. Intermediate the apertures 7 and 8 the web of the plate is offset as at 9 to afford a channel for the accommodation of the link 4 and interconnecting the balls $a$ and $b$ of the chain. A second offset 10, faced in the opposite direction, is formed in the margin of the plate to accommodate the link connecting the chain with the ball $b$ thereof.

The aperture 8 is of sufficient diameter to freely pass the chain balls therethrough. The aperture 7, however, is accurately predetermined to a diameter substantially that of the ball $a$, but accommodating the latter only under pressure.

The coupling is effected by passing the end balls $a$ and $b$ through the hole 8 in the direction indicated by the arrow $x$ in Fig. 2. The ball $a$, which constitutes the anchor member of the coupling, is then pressed into the aperture 7 in the plate. The link 4 is accommodated in the channel afforded by the offset 9, the ball $b$ in hole 8, while the link between the ball $b$ and the chain is accommodated in channel 10. Both balls and their links thus lie substantially in the plane of the plate 5 and stresses exerted in this plane have no tendency to unseat the ball $a$ from its anchorage in the hole 7.

The coupling is very economical to manufacture, and its connection with the chain is readily effected and is secure.

I claim as my invention—

1. A coupling device for bead chains comprising a sheet metal plate apertured to accommodate a jump ring or the like, and to accommodate a plurality of lineally adjacent chain balls, the aperture for the accommodation of the terminal ball of the chain corresponding substantially to the diameter of the ball, but receiving the latter with a drive fit.

2. A coupling device for bead chains comprising a sheet metal plate apertured to accommodate a jump ring or the like, and to accommodate a plurality of chain balls, the aperture for the accommodation of the terminal ball of the chain corresponding substantially to the diameter of the ball, but receiving the latter with a drive fit, the plate offset intermediate the chain ball apertures to accommodate a link interconnecting the balls.

3. A coupling device for bead chains comprising a sheet metal plate apertured to accommodate a jump ring or the like, and to accommodate a plurality of chain balls, the aperture for the accommodation of the terminal ball of the chain corresponding substantially to the diameter of the ball, but receiving the latter with a drive fit, the plate being marginally offset in communication with one of the chain ball apertures to accommodate a chain link.

4. A coupling for bead chains comprising a sheet metal plate having aligned ball-receiving apertures, the web of the plate being offset in one direction between the ball-receiving apertures, and in the opposite direction between one of said apertures and the margin of the plate, to form channels for the accommodation of chain links.

5. A coupling for bead chains comprising a sheet metal plate having aligned ball-receiving apertures, the web of the plate being offset in one direction between the ball-receiving apertures, and in the opposite direction between one of said apertures and the margin of the plate, to form channels for the accommodation of chain links, the aperture communicating with the marginal channel being of a diameter exceeding that of the chain balls.

In testimony whereof I have signed my name to this specification.

WILLIAM J. GAGNON.